United States Patent
Kitajima

(10) Patent No.: US 8,553,522 B2
(45) Date of Patent: Oct. 8, 2013

(54) OFDMA-BASED RADIO COMMUNICATION APPARATUS AND LEARNING SIGNAL GENERATION METHOD FOR COMPENSATION OF NON-LINEAR DISTORTION IN THE RADIO COMMUNICATION APPARATUS

(75) Inventor: Tasuku Kitajima, Tokyo (JP)

(73) Assignee: NEC Corporation, Tokyo (JP)

( * ) Notice: Subject to any disclaimer, the term of this patent is extended or adjusted under 35 U.S.C. 154(b) by 311 days.

(21) Appl. No.: 13/124,673

(22) PCT Filed: Nov. 5, 2009

(86) PCT No.: PCT/JP2009/068878
§ 371 (c)(1),
(2), (4) Date: Apr. 18, 2011

(87) PCT Pub. No.: WO2010/058700
PCT Pub. Date: May 27, 2010

(65) Prior Publication Data
US 2011/0200031 A1     Aug. 18, 2011

(30) Foreign Application Priority Data
Nov. 18, 2008  (JP) ................................. 2008-294285

(51) Int. Cl.
*H04J 11/00* (2006.01)
*H04K 1/02* (2006.01)
(52) U.S. Cl.
USPC ......................................... 370/203; 375/296
(58) Field of Classification Search
None
See application file for complete search history.

(56) References Cited

U.S. PATENT DOCUMENTS

| 7,558,223 B2 * | 7/2009 | Shirakata et al. | 370/280 |
| 7,626,921 B2 * | 12/2009 | Egashira et al. | 370/208 |
| 7,649,832 B2 * | 1/2010 | Egashira et al. | 370/206 |
| 7,675,989 B2 * | 3/2010 | Ahn et al. | 375/267 |
| 2004/0228417 A1 * | 11/2004 | Kennedy et al. | 375/260 |

(Continued)

FOREIGN PATENT DOCUMENTS

| CN | 101064578 A | 10/2007 |
| EP | 1249979 A2 | 10/2002 |

(Continued)

OTHER PUBLICATIONS

International Search Report for PCT/JP2009/068878 mailed Dec. 1, 2009.

(Continued)

*Primary Examiner* — Eunsook Choi

(57) ABSTRACT

An OFDMA radio communication apparatus of the present invention includes a radio transmitter that amplifies a transmission signal by a amplifier; and a distortion compensation unit that generates distortion compensation coefficient data that serve to compensate for non-linear distortion of the amplifier based on a learning signal and inputs a transmission signal obtained by multiplying an OFDMA signal by the distortion compensation coefficient data to the radio transmitter. The device further includes an MAC unit that generates the learning signal and inserts it as a burst signal in a burst region of OFDMA frames to which a burst signal can he allocated so as to generate OFDMA frame data; and a PHY unit that converts the OFDMA frame data into the OFDMA signal of a frequency domain based on a transmission mode of an OFDMA that has been set for the device and inputs it to the distortion compensation unit.

6 Claims, 3 Drawing Sheets

(56) References Cited

U.S. PATENT DOCUMENTS

| | | | |
|---|---|---|---|
| 2004/0233838 A1* | 11/2004 | Sudo et al. | 370/208 |
| 2005/0180534 A1* | 8/2005 | Brotje et al. | 375/350 |
| 2006/0153240 A1* | 7/2006 | Kikuma | 370/474 |
| 2006/0233270 A1* | 10/2006 | Ahn et al. | 375/260 |
| 2007/0086328 A1* | 4/2007 | Kao et al. | 370/208 |
| 2009/0268686 A1* | 10/2009 | Yamada et al. | 370/330 |
| 2010/0150013 A1* | 6/2010 | Hara et al. | 370/252 |
| 2010/0202563 A1* | 8/2010 | Yan et al. | 375/296 |

FOREIGN PATENT DOCUMENTS

| | | |
|---|---|---|
| EP | 1850547 A2 | 10/2007 |
| EP | 1949632 A1 | 7/2008 |
| JP | 11-74806 A | 3/1999 |
| JP | 2004128833 A | 4/2004 |
| JP | 2006262156 A | 9/2006 |
| JP | 2006279528 A | 10/2006 |
| JP | 2006527534 A | 11/2006 |
| JP | 2007295356 A | 11/2007 |
| JP | 2008072706 A | 3/2008 |
| JP | 2008131186 A | 6/2008 |
| JP | 2008258713 A | 10/2008 |
| TW | 200541280 A | 12/2005 |
| TW | 200814656 A | 3/2008 |

OTHER PUBLICATIONS

Taiwanese Office Action for TW09813S779 dated Aug. 1, 2013.
Chinese Office Action for CN Application No. 200980145081.1 issued on Jun. 3, 2013 with English Translation.

* cited by examiner

OFDMA-BASED RADIO COMMUNICATION APPARATUS AND LEARNING SIGNAL GENERATION METHOD FOR COMPENSATION OF NON-LINEAR DISTORTION IN THE RADIO COMMUNICATION APPARATUS

TECHNICAL FIELD

The present invention relates to a technique that generates a learning signal that serves to obtain distortion compensation coefficient data that compensate for non-linear distortion involved in a transmission amplifier disposed in an OFDMA (Orthogonal Frequency Division Multiple Access) based radio communication apparatus.

BACKGROUND ART

The OFDMA system is a system that divides a frequency domain into sub-channels and a time domain into symbols in frequency—time domains of OFDMA frames and allocates bandwidths as slots that represent the divided domains to users. The OFDMA system has been used for example in WiMAX (Worldwide Interoperability for Microwave Access).

OFDMA-based radio communication apparatuss have been focused on low cost and power saving of a transmission amplifier that amplifies transmission signals. However, the transmission amplifier has a problem in which non-linear distortion occurs.

Thus, the OFDMA-based radio communication apparatuss commonly use a distortion compensation unit so as to reduce the influence of non-linear distortion involved in the transmission amplifier.

The distortion compensation unit ordinarily generates distortion compensation coefficient data that serve to compensate for non-linear distortion involved in the transmission amplifier. However, in order to obtain the distortion compensation coefficient data, it is necessary to generate a learning signal.

A technique that generates such a learning signal is presented, for example, in Patent Literature 1. According to the technique presented in Patent Literature 1, a distortion compensation unit uses a learning signal generator and a frame generator so as to generate the learning signal.

RELATED ART LITERATURE

Patent Literature

Patent Literature 1: JP 11-74806 A

SUMMARY OF THE INVENTION

Problem to be Solved by the Invention

However, the technique presented in Patent Literature 1 involves the following problems.
(1) First Problem
According to the technique presented in Patent Literature 1, the radio communication apparatus needs to be provided with a learning signal as fixed data.
However, a transmission mode that is set for an OFDMA-based radio communication apparatus is decided by a combination of the following factors.
Bandwidth, for example, 5 MHz/7 MHz/10 MHz, etc.
Subcarrier permutation rule, for example, PUSC (Partial Usage of Subchannels)/FUSC (Full Usage of Subchannels)/AMC (Adaptive Modulation and channel Coding), etc.
Communication system, for example, SISO (Single Input Single Output)/MIMO (Multiple Input Multiple Output), etc.

Thus, when the radio communication system compensates for non-linear distortion involved in the transmission amplifier with distortion compensation coefficient data nearly conforming to the operating OFDMA system, there is a problem in that the radio communication apparatus needs to be provided with fixed data that is peculiar to each combination of individual factors of the transmission mode of the OFDMA system.
(2) Second Problem
Ordinarily, immediately after the radio communication apparatus activates, it generates distortion compensation coefficient data (initial learning) and after it enters an operation state for user traffic communication, it periodically generates distortion compensation coefficient data (periodic learning).

In other words, periodic learning is performed during the operation of the OFDMA-based radio communication system. Thus, if the radio communication system is a radio base station, fixed data that is generated in the radio base station during the periodic learning operation is transmitted to terminal stations.

However, according to the technique presented in Patent Literature 1, since the radio base station sends fixed data regardless of congestion and transmission repetition of user traffic during the periodic learning operation, there is a problem in that the system throughput deteriorates. In addition, since fixed data generated in the radio base station during the periodic learning operation are not present in MAP information, there is a problem in that the terminal station side receives the fixed data as invalid data, resulting in occurrence of a reception disorder.

Therefore, an object of the present invention is to provide an OFDMA-based radio communication apparatus and a learning signal generation method by the radio communication apparatus that can solve any of the foregoing problems.

Means that Solve the Problem

An OFDMA-based radio communication apparatus according to the present invention that comprises; a radio transmission unit that amplifies a transmission signal by a transmission amplifier; and a distortion compensation unit that generates distortion compensation coefficient data that serve to compensate for non-linear distortion of said transmission amplifier based on a learning signal and that inputs a transmission signal obtained by multiplying an OFDMA signal by the distortion compensation coefficient data to said radio transmission unit, wherein the radio communication apparatus further comprises:

an MAC unit that generates said learning signal and inserts the generated learning signal as a burst signal in a burst region of OFDMA frames to which a burst signal can be allocated so as to generate OFDMA frame data; and a PHY unit that converts said OFDMA frame data into said OFDMA signal of a frequency domain based on a transmission mode of an OFDMA system that has been set for said radio communication apparatus and that inputs said converted OFDMA signal to said distortion compensation unit.

A learning signal generation method according to the present invention that generates a learning signal in an OFDMA-based radio communication apparatus comprises a radio transmission unit that amplifies a transmission signal by a transmission amplifier; and a distortion compensation unit that generates distortion compensation coefficient data that serve to compensate for non-linear distortion of said transmission amplifier based on said learning signal and that inputs a transmission signal obtained by multiplying an OFDMA signal by the distortion compensation coefficient data to said radio transmission unit, wherein the learning signal generation method comprises:

an MAC processing step that generates said learning signal and inserts the generated learning signal as a burst signal in a burst region of OFDMA frames to which a burst signal can be allocated so as to generate OFDMA frame data; and a PHY processing step that converts said OFDMA frame data into said OFDMA signal of a frequency domain based on a transmission mode of an OFDMA system that has been set for said radio communication apparatus and that inputs said converted OFDMA signal to said distortion compensation unit.

Effect of the Invention

According to the radio communication apparatus of the present invention, a MAC unit generates a learning signal that serves to obtain distortion compensation coefficient data and inserts the generated learning signal as a dummy burst signal in OFDMA frames, while a PHY unit converts the OFDMA frame data into an OFDMA signal of a frequency domain based on a transmission mode that has been set for the radio communication apparatus.

Thus, an effect is obtained in which non-linear distortion involved in a transmission amplifier can be compensated for with distortion compensation coefficient data of the operating OFDMA system without requiring fixed data that is peculiar to combinations of individual factors of the transmission mode of the OFDMA system.

BEST MODE FOR CARRYING OUT THE INVENTION

In the following, a best mode that carries out the present invention will be described with reference to drawings.

In the following exemplary embodiment, although the case in which the radio communication apparatus according to the present invention is applied to a radio base station will be exemplified, the present invention is not limited thereto.

Figure 1:
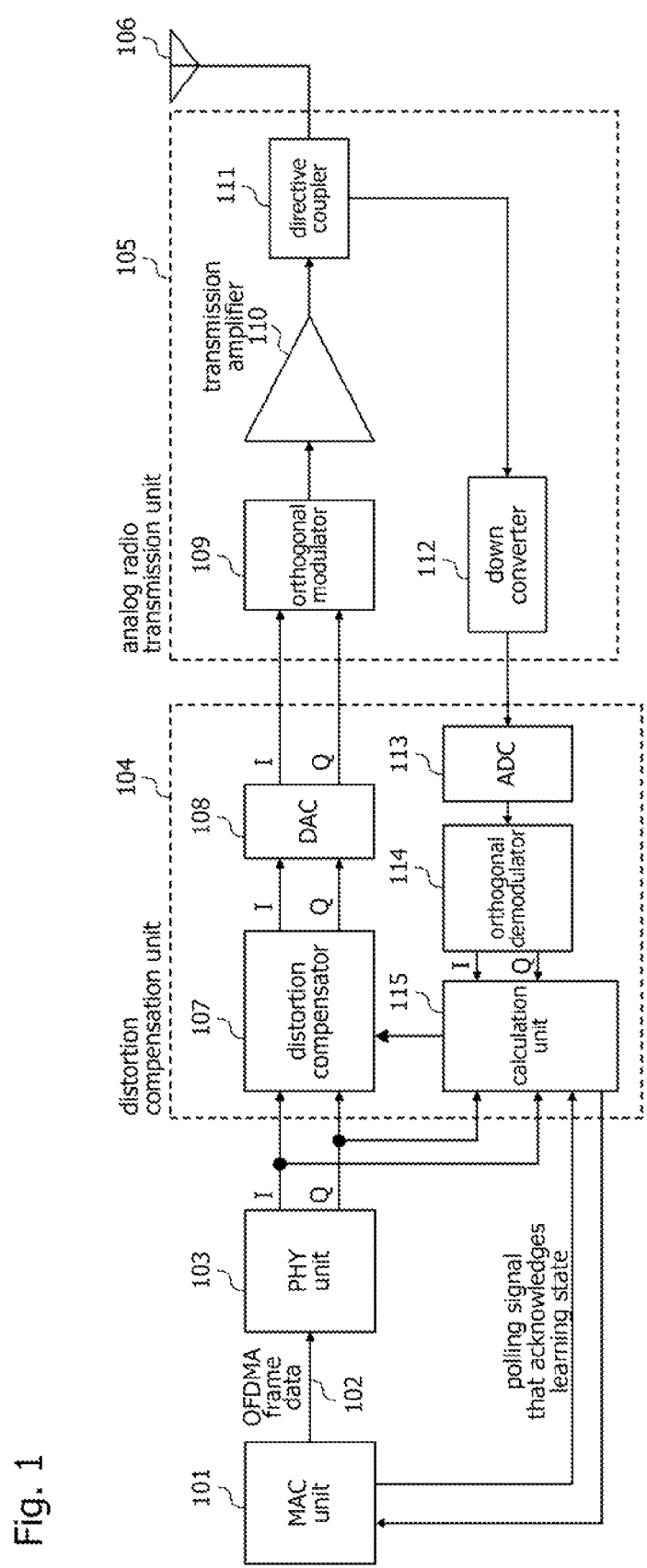
FIG. 1 is a block diagram showing a structure of a radio base station as an exemplary embodiment applied to a radio communication apparatus according to the present invention.

As shown in FIG. 1, the radio base station according to this exemplary embodiment comprises MAC (Medium Access Control) unit 101, PHY (Physical Layer) unit 103, distortion compensation unit 104, and analog radio transmission unit 105.

MAC unit 101 has a function that inserts various types of signals of the MAC level in frequency—time domains of OFDMA frames so as to generate OFDMA frame data 102.

Here, with reference to FIG. 2 and FIG. 3, a structure of OFDMA frames will be described.

Figure 2:
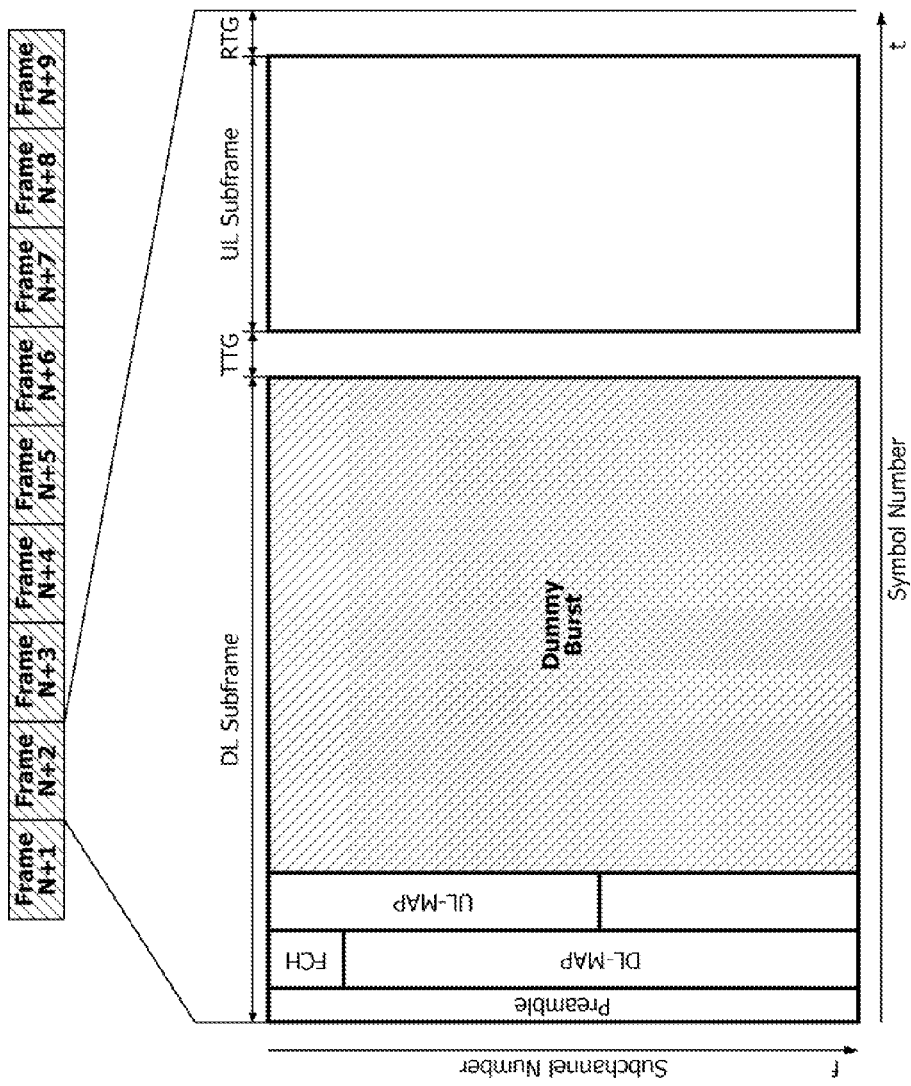
FIG. 2 is a schematic diagram describing an initial learning operation of the radio base station shown in FIG. 1.
Figure 3:
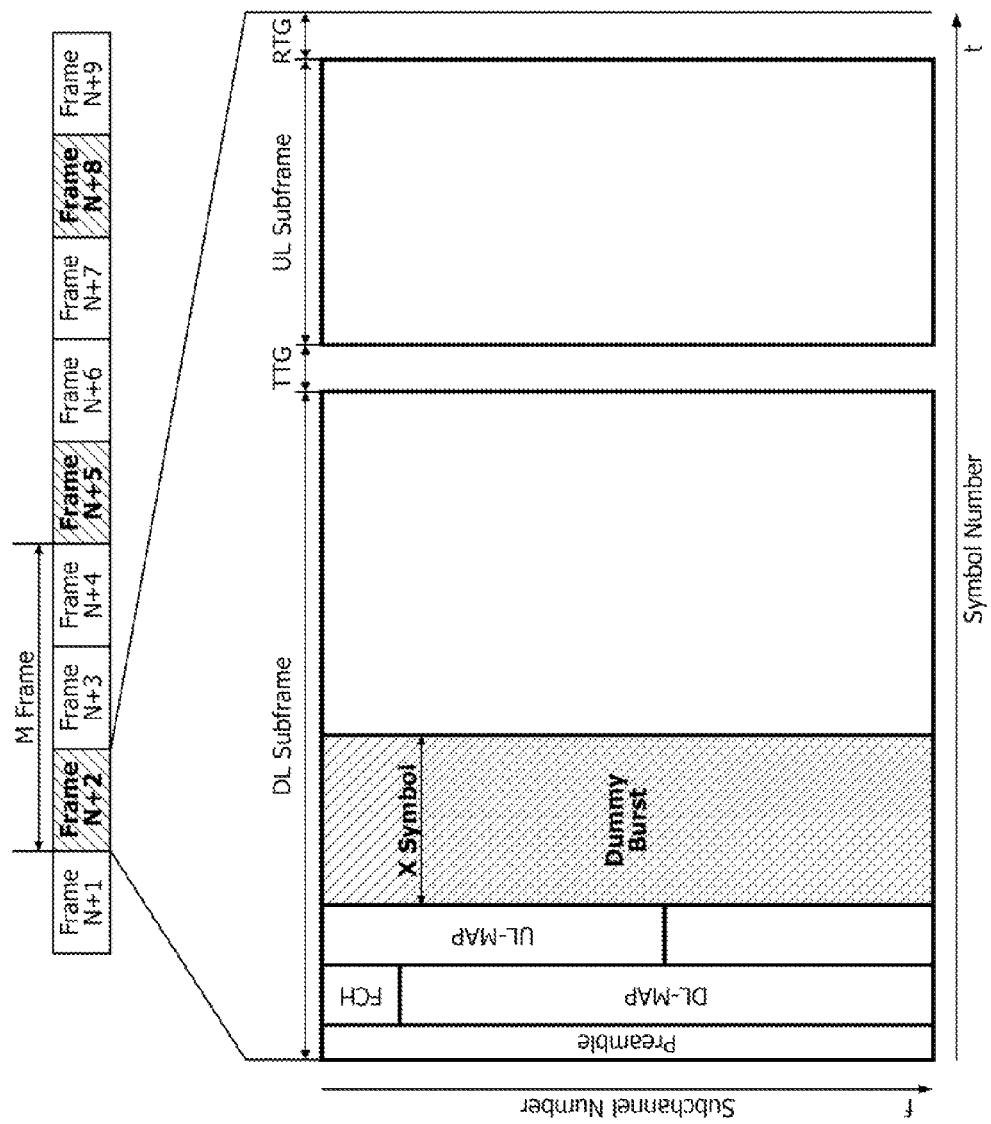
FIG. 3 is a schematic diagram describing a periodic learning operation of the radio base station shown in FIG. 1.

Referring to FIG. 2 and FIG. 3, an OFDMA frame is comprised of a DL (Downlink) subframe for a DL and a UL (Uplink) subframe for a UL. In these drawings, the horizontal axis represents symbol numbers, while the vertical axis represents sub-channel numbers. A gap time called TTG (Transmit/Receive Transition Gap) and RTG (Receive/Transmit Transition Gap) is provided between the UL subframe and DL subframe.

A preamble region, in which the same reference signal is always inserted, is provided at the beginning of the OFDMA frame. Followed by this region, an FCH (frame control header) region, in which a signal that defines an encoding mode of a DL-MAP region that will be described later and a channel group for use is inserted, is provided. In addition, a DL-MAP region, in which a signal that defines the position of the allocation of a burst signal of the DL in the DL subframe is inserted, is provided, and an UL-MAP region, in which a signal that defines the position of the allocation of a burst signal of the UL in the UL subframe is inserted, is provided.

In the DL subframe, the burst signal of the DL of such as user traffic is inserted in a position defined in the DL-MAP region after the DL-MAP region and the UL-MAP region. In this specification, the region in which the burst signal of the DL can be allocated in the DL subframe is defined as "burst region".

This exemplary embodiment is characterized in that MAC unit 101 generates a learning signal that serves to obtain distortion compensation coefficient data and that inserts the generated learning signal as a dummy burst signal in the burst region like an ordinary burst signal, for example, of user traffic.

Referring to FIG. 1 once again, PHY unit 103 has a function that converts OFDMA frame data 102 that are output from MAC unit 101 into a digital IQ signal that is an OFDMA signal of a frequency domain based on a transmission mode that has been set for the radio base station.

For example, if PHY unit 103 performs an SISO communication, it successively performs error correction encoding, subcarrier modulation, subcarrier permutation, serial-parallel conversion, IFFT (Inverse Fast Fourier Transform), parallel-serial conversion, and guard-interval addition for OFDMA frame data 102 so as to generate the digital IQ signal.

On the other hand, if PHY unit 103 performs an MIMO communication, although it performs processes in the sequence similar to that for the SISO communication, it additionally performs an MEMO process that separates signals before the subcarrier permutation process.

A primary signal system of distortion compensation unit 104 comprises; distortion compensator 107 that multiplies the digital IQ signal that is output from PHY unit 103 by distortion compensation coefficient data calculated by calculation unit 115 that will be described later so as to perform a non-linear distortion compensation process; and DAC (Digital Analog Converter) 108 that converts the digital IQ signal that is output from distortion compensator 107 into an analog signal.

Analog radio transmission unit 105 comprises; orthogonal modulator 109 that performs orthogonal modulation for the analog transmission signal that is output from DAC 108 and converts the modulated signal into a radio frequency signal; transmission amplifier 110 that amplifies the radio frequency signal that is output from orthogonal modulator 109; directive coupler 111 that emits the radio frequency signal that is output from transmission amplifier 110 in the air through antenna 106 and feeds back the radio frequency signal to distortion compensation unit 104; and down-converter 112 that frequency-converts the radio frequency signal that is fed back to distortion compensation unit 104 to an intermediate frequency signal.

A feedback system of distortion compensator 107 comprises; ADC (Analog Digital Converter) 113 that converts the intermediate frequency signal that is output from down-converter 112 into a digital signal; orthogonal demodulator 114 that demodulates the digital signal that is output from ADC 113 and extracts the digital IQ signal therefrom; and calculation unit 115 that compensates for the delay of the digital IQ signal that is output from PHY unit 103 and that divides the compensated signal by the digital IQ signal that is demodulated by orthogonal demodulator 114 so as to calculate distortion compensation coefficient data.

In addition, MAC unit 101 has a function that transmits a polling signal that serves to issue a query to calculation unit 115 about whether or not a learning operation that generates distortion compensation coefficient data has been completed, while calculation unit 115 has a function that replies to MAC unit 101 about whether the learning operation has been completed.

In the following, with reference to FIG. 1 to FIG. 3, the operation of the radio base station according to this exemplary embodiment will be described.

As shown in FIG. 1, in the radio base station, first of all, MAC unit 101 generates a learning signal that serves to obtain distortion compensation coefficient data and inserts the signal as a dummy burst signal in the burst region of the OFDMA frames so as to generate OFDMA frame data 102.

Thereafter, PHY unit 103 converts OFDMA frame data 102 into a digital IQ signal that is an OFDMA signal of a frequency domain based on a transmission mode that has been set for the radio base station.

Thereafter, distortion compensation unit 104 multiplies the digital IQ signal by distortion compensation coefficient data so as to perform a non-linear distortion compensation process that compensates the non-linear characteristic of transmission amplifier 110.

Thereafter, analog radio transmission unit 105 performs orthogonal modulation for the transmission signal, which is the analog signal into which the digital IQ signal has been converted by DAC 108 so as to convert the transmission signal into a radio frequency signal. This radio frequency signal is emitted in the air through antenna 106.

In addition, analog radio transmission unit 105 feeds back the radio frequency signal that has passed through transmission amplifier 110 to distortion compensation unit 104. Distortion compensation unit 104 generates the foregoing distortion compensation coefficient data based on the fed-back radio frequency signal.

In addition, MAC unit 101 transmits a poling signal to calculation unit 115 so as to issue a query to it about whether or not the learning operation has been completed, while calculation unit 115 replies to MAC unit 101 about whether or not the learning operation has been completed.

Here, the learning operation that generates distortion compensation coefficient data that serve to compensate for non-linear distortion. involved in transmission amplifier 110 will be categorized as two types of operations and these learning operations will be described in detail.

One of these operations is a learning operation that is performed immediately after the radio base station activates and it initially generates distortion compensation coefficient data (initial learning), while the other is a learning operation that the radio base station periodically performs after it enters an operation state in which it performs user traffic communication (periodic learning).

<Initial Learning Operation>

When distortion compensation coefficient data are initially generated after the radio base station activates (initial learning), it is necessary to generate the distortion compensation coefficient data as quickly as possible.

Thus, as shown in FIG. 2, after MAC unit 101 inserts necessary broadcast messages in the DL-MAP region and the UL-MAP region of each OFDMA frame, MAC unit 101 inserts a learning signal (dummy burst signal) in the burst region until the end of the burst region is filled with the learning signal. During the initial learning operation, MAC unit 101 transmits a polling signal to calculation unit 115 so as to issue a query to it about whether or not the learning operation has been completed, while calculation unit 115 replies to MAC unit 101 about whether or not the learning operation has been completed.

If the polling result denotes that the learning operation has been completed, transition to the periodic learning operation occurs.

If the polling result denotes that the learning operation has not been completed, the initial learning operation continues.

<Periodic Learning Operation>

When the learning operation is performed after transition to the operation state for user traffic (periodic learning), it is necessary to insert a necessary learning signal without restricting the bandwidth of the DL taking into consideration congestion and transmission repetition of user traffic.

Thus, as shown in FIG. 3, after MAC unit 101 inserts necessary broadcast messages in the DL-MAP region and the UL-MAP region in each OFDMA frame and inserts the learning signal (dummy burst signal) of X (where X is any integer that is 1 or greater and less than the total number of symbols in the burst region) symbols for every M (where M is any integer that is 2 or greater) frame.

However, taking into consideration congestion and transmission repetition of user traffic, if a burst signal of X symbols or greater has been inserted in the immediately preceding M frames of the OFDMA frames, MAC unit 101 does not insert the learning signal in the OFDMA frames.

In other words, MAC unit 101 discards the allocation of the learning signal to the OFDMA frames even if they have scheduled frame numbers. Thus, since user traffic can be effectively allocated, distortion compensation unit 104 can periodically update distortion compensation coefficient data without restricting the communication bandwidth of the DL.

The X symbols and M frames are parameters for which the provider needs to properly set so as to stably perform the periodic learning operation.

As described above, in this exemplary embodiment, MAC unit 101 generates a learning signal that serves to obtain distortion compensation coefficient data and inserts it as a dummy burst signal in the OFDMA frames, while PHY unit 103 converts OFDMA frame data 102 into an OFDMA signal of a frequency domain based on a transmission mode that has been set for the radio base station and inputs the converted signal to distortion compensation unit 104.

Thus, an effect is obtained that, using distortion compensation coefficient data of the operating OFDMA system, the non-linear distortion involved in transmission amplifier 110 can be compensated for without requiring fixed data that is peculiar to combinations of individual factors of the transmission mode of the OFDMA system.

Moreover, an effect is obtained that, since the learning signal is inserted as a valid signal of the MAC level in the OFDMA frames, even if the terminal station receives the learning signal during the periodic learning operation, it receives the learning signal as a self-addressed valid signal of the MAC level, thereby a reception disorder due to reception of a non-self-addressed signal can be prevented.

In addition, in this exemplary embodiment, MAC unit 101 inserts the learning signal in the burst region of all the OFDMA frames during the initial learning operation until the end of the burst region is filled with the learning signal.

Thus, an effect is obtained in which distortion compensation coefficient data can be quickly generated during the initial learning operation.

Moreover, in this exemplary embodiment, MAC unit 101 inserts the learning signal of X symbols in the burst region of every M frames of the OFDMA frames during the periodic learning. Moreover, if the burst signal of X symbols or greater has been inserted in the immediate preceding M frames of the OFDMA frames during the periodic learning operation, MAC unit 101 will not insert the learning signal in the burst region.

Thus, when X symbols and M frames are set taking into consideration congestion and transmission repetition of user traffic during the periodic learning operation, since scheduling for which the learning signal is not inserted can be made, an effect is obtained in which distortion compensation coefficient data can be periodically updated without a tradeoff of deterioration of throughput.

Until now, with reference to the exemplary embodiment, the present invention has been described. However, it should be understood by those skilled in the art that the structure and details of the present invention may be changed in various manners without departing from the scope of the present invention.

The present application is the National Phase of PCT/JP2009/068878, filed Nov. 5, 2009, which claims priority based on Japanese Patent Application JP 2008-294285 filed on Nov. 18, 2008, the entire contents of which being incorporated herein by reference in its entirety.

The invention claimed is:

1. An OFDMA-based radio communication apparatus that comprises; a radio transmission unit that amplifies a transmission signal by a transmission amplifier; and a distortion compensation unit that generates distortion compensation coefficient data that serve to compensate for non-linear distortion of said transmission amplifier based on a learning signal and inputs a transmission signal obtained by multiplying an OFDMA signal by the distortion compensation coefficient data to said radio transmission unit, wherein the radio communication apparatus further comprises:

an MAC unit that generates said learning signal and inserts the generated learning signal as a burst signal in a burst region of OFDMA frames to which a burst signal can be allocated so as to generate OFDMA frame data; and a PHY unit that converts said OFDMA frame data into said OFDMA signal of a frequency domain based on a transmission mode of an OFDMA system that has been set for said radio communication apparatus and inputs said converted OFDMA signal to said distortion compensation unit, wherein said MAC unit inserts said learning signal in the burst region of the OFDMA frames until the end of the burst region is filled with the learning signal immediately after said radio communication apparatus activates until said distortion compensation coefficient data have been initially and completely generated.

2. The radio communication apparatus as set forth in claim 1, wherein said MAC unit inserts the learning signal of X (where X is any integer that is 1 or greater and less than the total number of symbols of the burst region) for every M (where M is any integer greater than 2) frames in the burst region of the OFDMA frames after said distortion compensation coefficient data have been initially and completely generated and a transition to an operation state has occurred.

3. The radio communication apparatus as set forth in claim 2, wherein said MAC unit does not insert said learning signal if the burst signal of X symbols or greater has been inserted in the immediately preceding M frames of the OFDMA frames after the transition to the operation state has occurred.

4. A learning signal generation method that generates a learning signal in an OFDMA-based radio communication apparatus that comprises a radio transmission unit that amplifies a transmission signal by a transmission amplifier; and a distortion compensation unit that generates distortion compensation coefficient data that serve to compensate for non-linear distortion of said transmission amplifier based on said learning signal and inputs a transmission signal obtained by multiplying an OFDMA signal by the distortion compensation coefficient data to said radio transmission unit, wherein the learning signal generation method comprises:

an MAC processing step that generates said learning signal and inserts the generated learning signal as a burst signal in a burst region of OFDMA frames to which a burst signal can be allocated so as to generate OFDMA frame data; and a PHY processing step that converts said OFDMA frame data into said OFDMA signal of a frequency domain based on a transmission mode of an OFDMA system that has been set for said radio communication apparatus and inputs said converted OFDMA signal to said distortion compensation unit, wherein said MAC processing step inserts said learning signal in the burst region of the OFDMA frames until the end of the burst region is filled with the learning signal immediately after said radio communication apparatus activates until said distortion compensation coefficient data have been initially and completely generated.

5. The learning signal generation method as set forth in claim 4, wherein said MAC processing step inserts the learning signal of X (where X is any integer that is 1 or greater and less than the total number of symbols of the burst region) for every M (where M is any integer greater than 2) frames in the burst region of the OFDMA frames after said distortion compensation coefficient data have been initially and completely generated and a transition to an operation state has occurred.

6. The learning signal generation method as set forth in claim 5, wherein said MAC processing step does not insert said learning signal if the burst signal of X symbols or greater has been inserted in the immediately preceding M frames of the OFDMA frames after the transition to the operation state has occurred.

* * * * *